(12) United States Patent
Georgiev

(10) Patent No.: US 6,944,290 B2
(45) Date of Patent: Sep. 13, 2005

(54) ECHO CANCELLATION THROUGH AUXILIARY-VECTOR FILTERING

(75) Inventor: Vladimir N. Georgiev, North Tonawanda, NY (US)

(73) Assignee: Intel Coporation, Santa Clara, CA (US)

( * ) Notice: Subject to any disclaimer, the term of this patent is extended or adjusted under 35 U.S.C. 154(b) by 637 days.

(21) Appl. No.: 09/835,154

(22) Filed: Apr. 14, 2001

(65) Prior Publication Data

US 2002/0150235 A1 Oct. 17, 2002

(51) Int. Cl.[7] .............................................. H04M 9/08
(52) U.S. Cl. ......................... 379/406.06; 379/406.2; 379/406.5; 379/406.7; 379/406.16
(58) Field of Search ................ 379/406.01, 406.06, 379/406.08, 406.03, 406.15, 406.09, 406.02, 406.04, 406.05, 406.07, 406.11, 406.12, 406.13, 406.14, 406.16, 406.1

(56) References Cited

U.S. PATENT DOCUMENTS

| | | | | |
|---|---|---|---|---|
| 5,029,167 A | * | 7/1991 | Arnon et al. ............... 370/290 |
| 5,125,024 A | * | 6/1992 | Gokcen et al. .......... 379/88.01 |
| 5,295,163 A | * | 3/1994 | Fehlauer et al. ............ 375/366 |
| 5,400,394 A | * | 3/1995 | Raman et al. ........... 379/88.07 |
| 5,519,764 A | * | 5/1996 | Pierce et al. ............. 379/88.23 |
| 5,535,194 A | * | 7/1996 | Ashley et al. ............... 370/289 |
| 5,638,436 A | * | 6/1997 | Hamilton et al. ........... 379/351 |
| 6,078,573 A | * | 6/2000 | Batalama et al. ........... 370/335 |
| 6,081,593 A | * | 6/2000 | Kim ...................... 379/406.08 |
| 6,185,300 B1 | * | 2/2001 | Romesburg ............ 379/406.09 |
| 6,377,682 B1 | * | 4/2002 | Benesty et al. ........ 379/406.01 |
| 6,788,785 B1 | * | 9/2004 | Ding ..................... 379/406.08 |

OTHER PUBLICATIONS

D.A. Pados, et al., "Joint Space–Time Auxiliary–Vector Filtering for DS/CDMA Systems with Antenna Arrays," IEEE Transactions on Communications, vol. 47, Issue 9, Sep. 1999, pp. 1406–1415.

* cited by examiner

*Primary Examiner*—Binh Tieu
*Assistant Examiner*—Tuan Pham
(74) *Attorney, Agent, or Firm*—Alan Pedersen-Giles

(57) ABSTRACT

A digit signal processing system may include a near end and a far end connected by a pair of signal transmission paths. A signal processing may be located at the near end through which signal commands are transmitted to the far end. A signal transducing device may be located at the far end to receive the signal commands and to transmit to the near end signals indicating the state of the signal transducing device. A signal canceller may be operatively associated with the signal processor to subtract undesired signals from the received signals. The signal canceller may employ Auxiliary-Vector filtering.

20 Claims, 3 Drawing Sheets

ECHO CANCELLATION THROUGH AUXILIARY-VECTOR FILTERING

BACKGROUND

This embodiment of the invention relates to digital signal processing, and more particularly to echo cancellation in voice processing systems such as voice mail systems and communication or audio systems.

Echo cancellers are used to reduce the amounts of undesirable echo in telephony voice mail systems. This echo comes from the system's far end as a result of playing voice prompts and is dependent on the distance between the near and the far ends, as well as on the quality of the phone line wires and the connections between them. It is not desired because it can mask a desired response coming from the far end, e.g. dual tone multiple frequency (DTMF) digits. Echo cancellers are usually built as adaptive filters, because they must adapt to the characteristics of specific channels. A digital filter is defined as an array of numbers (also referred to as "coefficients" or "taps"). The array has a length L. A signal is said to be "digitally filtered" when L values of the signal are multiplied by the L filter coefficients.

Two problems have been faced with such adaptive filters. One is the amount of echo reduction. Echo should be reduced to a level which is under a specified (desired) level of the DTMF digits, where level refers to the power of the signal. Values are usually required to be under −39 dbm. Another problem is the amount of time needed for the adaptation of the filter. Echo cancellers' tap values are usually initialized either with zeroes or with some initial values (line probing), but in order to more closely imitate the characteristics of the channel, they need some time to converge, meaning to obtain values that represent these characteristics with a higher precision. There are theoretical scenarios, where user input (DTMF digits) can be missed if the convergence time is too long.

This invention provides the needed echo reduction and reduces the time needed for adaptation of the echo-cancelling filter.

BRIEF DESCRIPTION OF THE DRAWING FIGURES

DETAILED DESCRIPTION

Figure 1:
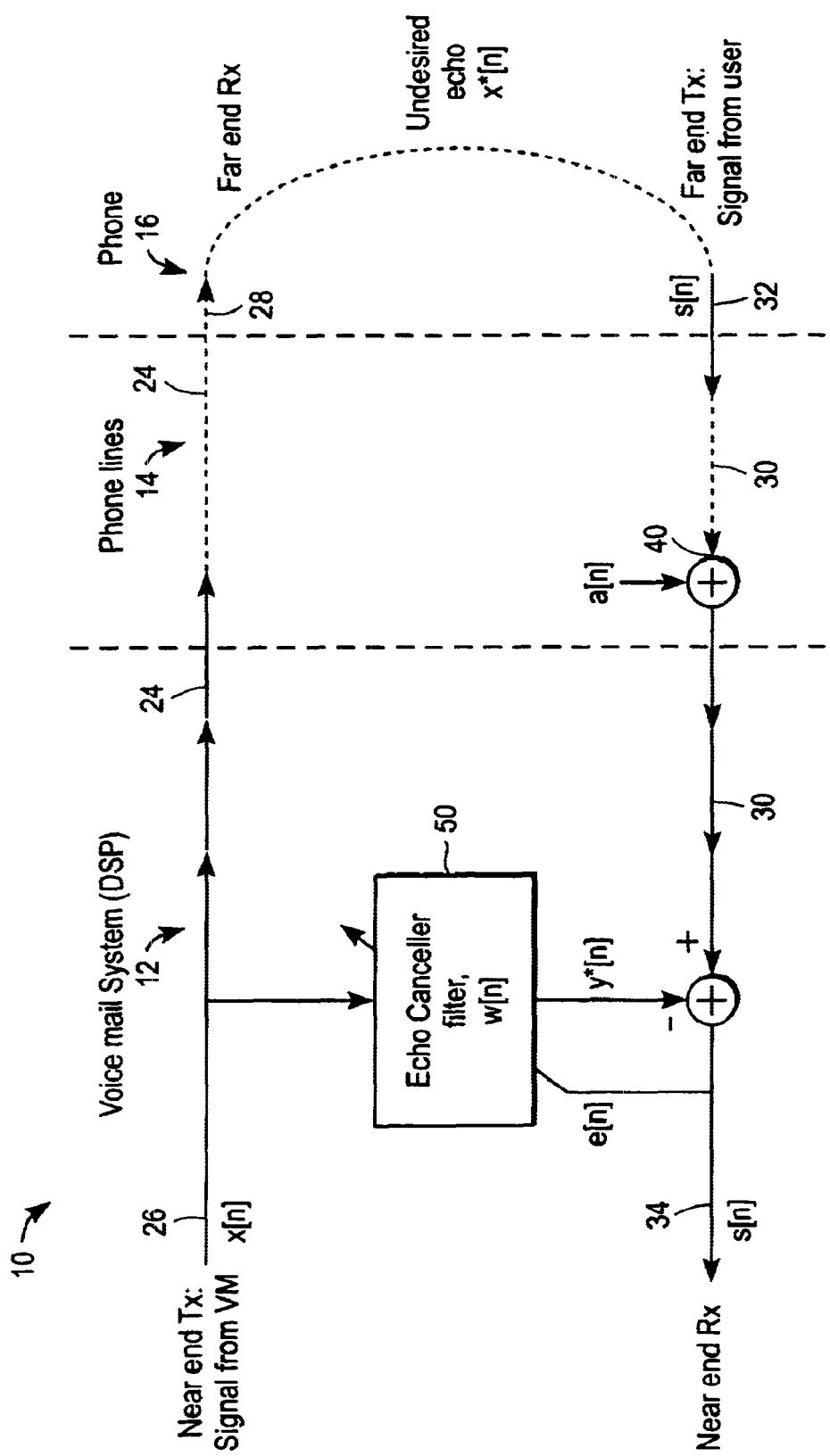
FIG. 1 is a schematic block diagram illustrating the echo canceller of one embodiment of the invention in a telephony voice mail system.

FIG. 1 illustrates the echo canceller of one embodiment of the invention in a voice processing system, such as a voice mail system (VMS) 10 for example. A digital communications setup (digital phones, etc.) is considered. Voice mail system 10 comprises a digital signal processor (DSP) 12, phone lines 14 and a voice/signal transducing device in the form of a telephone set 16. As used herein the one end of the system adjacent the DSP 12 is designated the near end and the opposite end including phone 16 is designated the far end. VMS 10 may also include a voice mail application at the near end. A voice mail application may be, for example, a software program running on a certain type of hardware for example using some of the DSP resources. At the far end there usually is a phone set operated by a human user. There are phone lines connecting the near and far ends. The system 10 may include a first path 24 extending from the voice mail system DSP 12 to telephone set 16. The portion of path 24 at DSP 12 is designated a near end transmitting point 26 (Near end Tx), and the portion of the path 24 at phone 16 is identified as a far end receiving point 28 (Far end Rx). The system 10 may include a second path 30 extending from the telephone set 16 to voice mail system DSP 12. The portion of path 30 at phone 16 is designated a far end transmitting point 32 (Far end Tx), and the portion of path 30 at DSP 12 is designated a near end receiving point 34 (Near end Rx).

The voice mail system at the near end sends voice mail prompts along path 24 to telephone set 16. These and any other signal components from the voice mail system are designated x[n] in FIG. 1. The signal of interest designated s[n] is generated by the user at the far end, and one example is a signal representing a button pressed on telephone set 16 when the user hears a voice mail prompt. This signal s[n] is to be returned along path 30 to the voice mail system at the near end. The undesired echo generated at telephone set 16 is identified by x*[n] in FIG. 1. The undesired echo can be caused in several ways, such as in speaker phone use or accessing voice mail via a cell phone. Noise from the phone lines, making/breaking connections, etc. is represented a[n] and is added to path 30 at 40.

Thus, signal x[n] represents the voice prompts, played from the near-end, which travel through the telephone network to the far end. A slight amount of echo is present in the received signal y[n] (y[n]=s[n]+x*[n]+a[n], where s[n] is the signal of interest, returned from the far end, x*[n] is the undesirable echo and a[n] combines all other noise sources-channel, etc.). In particular, there usually is a slight amount of echoed far end received signal through the far-end transmit (Tx) line. What one would usually like to see in the signal received at the near-end would be a signal which represents the signal from user s[n], which may contain user data—voice or commands (usually keys pressed on the phone set are considered commands)—that may be processed by the VMS. An echo canceller 50 is provided and may be operatively associated with the DSP 12 of the voice mail system. The purpose of the echo canceller 50 is to subtract the echo from the received signal, so that only the useful part remains. An illustrative form of echo canceller 50 is software running on DSP 12. The software may be in the form of a program of instructions to process the signals in which undesired signals, e.g., the echo, are cancelled, and the program may be embodied in a program storage device readable by a machine, such as the DSP, and which instructions are executable by the machine An echo canceller works by trying to calculate a satisfactory estimate of the transmitted signal x[n] with all the outside factors (undesirable, in most of the cases) superimposed on it. When a VMS is started, the echo canceller (which may also be referred to as an "adaptive filter" or "filter") has predetermined coefficient values as explained hereinabove. Then, for a certain period of time, the filter tries to adapt these coefficients so that the signal y*[n] represents a more exact replica of the signal $$y[n]=s[n]+x^*[n]+a[n]$$

where
  y[n] is the signal received at the near end;
  s[n] is the signal containing user data;
  x*[n] is the undesired echo from the near-end transmitted signal x[n];

a[n] comprises all the noise factors (channel noise, etc.).

The echo canceller providing w[n] may be implemented as a digital filter, i.e. as an array of coefficients. This filter is adaptive, that is it changes the values of its coefficients, also called taps, while receiving data from the channel (y[n]) and also having knowledge about the transmitted signal x[n].

There are at least two things to consider about starting and stopping the filter adaptation process. First, when the near end starts transmitting, there is some time that has to pass before the near end received signal y[n] starts getting the echo from x[n]. In order to determine this moment, speech detection algorithms may be added to the VMS. Second, the echo canceller should adapt if the far-end transmitted signal s[n] is not present. In this case, the signal e[n],is present at 34 in FIG. 1. It represents the error between the real received signal y[n], which contains the echo and all other undesired random noise, and the signal y*[n], which is produced at the output of the echo canceller 50 and which is an estimation of all the factors that the real channel superimposes on the received signal. If the signal s[n] is present at adaptation time, it will be considered undesired and the filter will try to cancel it. So, short adaptation time may be important.

In accordance with one embodiment of the invention, the echo canceller 50 employs Auxiliary Vector filtering. It takes the transmitted signal x[n], multiplies it by an array of filter coefficients w[n] and then subtracts the result from the received signal. In the invention, w[n] is computed by means of an Auxiliary-Vector filtering algorithm. The operation may be summarized as follows:

The near end (VMS) starts transmitting.

Signal detection algorithm is started immediately in the VMS. Filter coefficients of the echo canceller are initialized with fixed start-up values.

When the echo is detected, the filter starts adapting its coefficient values.

After a certain amount of time, the filter has adapted its coefficients and is ready for the real echo cancellation.

The Auxiliary-Vector filtering algorithm may be specified in detail by the following relationships:

$$R=Y^T*Y$$

$$V=Y^T*X$$

$$G=(R*V-(V^T*R*V)*V)/\text{norm}(R*V-(V^T*R*V)*V)$$

$$U=(G^T*R*V)/(G^T*R*G)$$

$$w=V-U*G$$

The vector Y consists of one row and N columns and contains N values of the signal y[n]. In other words N is the number of samples the VMS can process at a given moment. N may also be the echo cancellation filter length, e.g., the number of filter taps in the array. In one embodiment of the invention, N usually is between 16 and 512.

The first operation in the above algorithm is to form the matrix R from the vector Y and $Y^T$. $Y^T$ denotes a matrix transposition operation, performed on the vector Y. The matrix R has dimensions N×N. The next step in the algorithm is to form the vector V by multiplying $Y^T$ on with X which is a single value (or a vector with one row and one column). X contains one value of the signal x[n]. The resulting vector V has the dimensions N×1.

Figure 2:
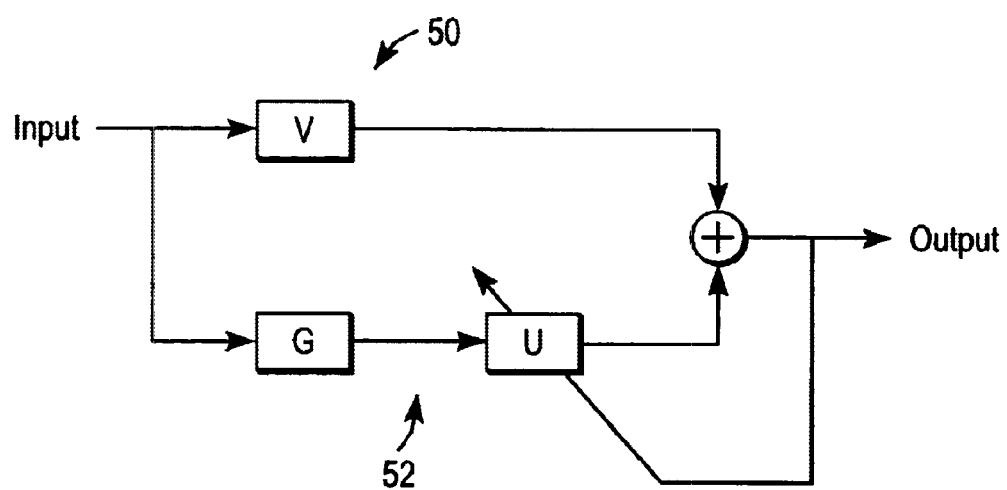
FIG. 2 is a schematic block diagram illustrating the Auxiliary-Vector utilized in the echo-canceller of one embodiment of the invention.

The next operation in the algorithm is to form the Auxiliary Vector:

$$G=(R*V-(V^T*R*V)*V)/\text{norm}(R*V-(V^T*R*V)*V)$$

where the operation norm ( ) denotes a matrix normalization operation. The resulting Auxiliary Vector G has dimensions N×1. This is the vector that maximizes the magnitude of the cross correlation between the main-stream processed data (the V branch designated 50 in FIG. 2) and the auxiliary-vector beam processed data (the U*G branch designated 52 in FIG. 2).

The next operation in the algorithm is to form the scalar:

$$U=(G^T*R*V)/(G^T*R*G)$$

U is a scalar which minimizes the output variances of the filter coefficients. The next operation in the algorithm is to form the vector:

$$w=V-U*G$$

The vector w consists of one row and N columns and it contains the filter tap values. After the foregoing adaptation process ends, w contains the values which should cancel the undesired noise factors, e.g., the echo.

Figure 3:
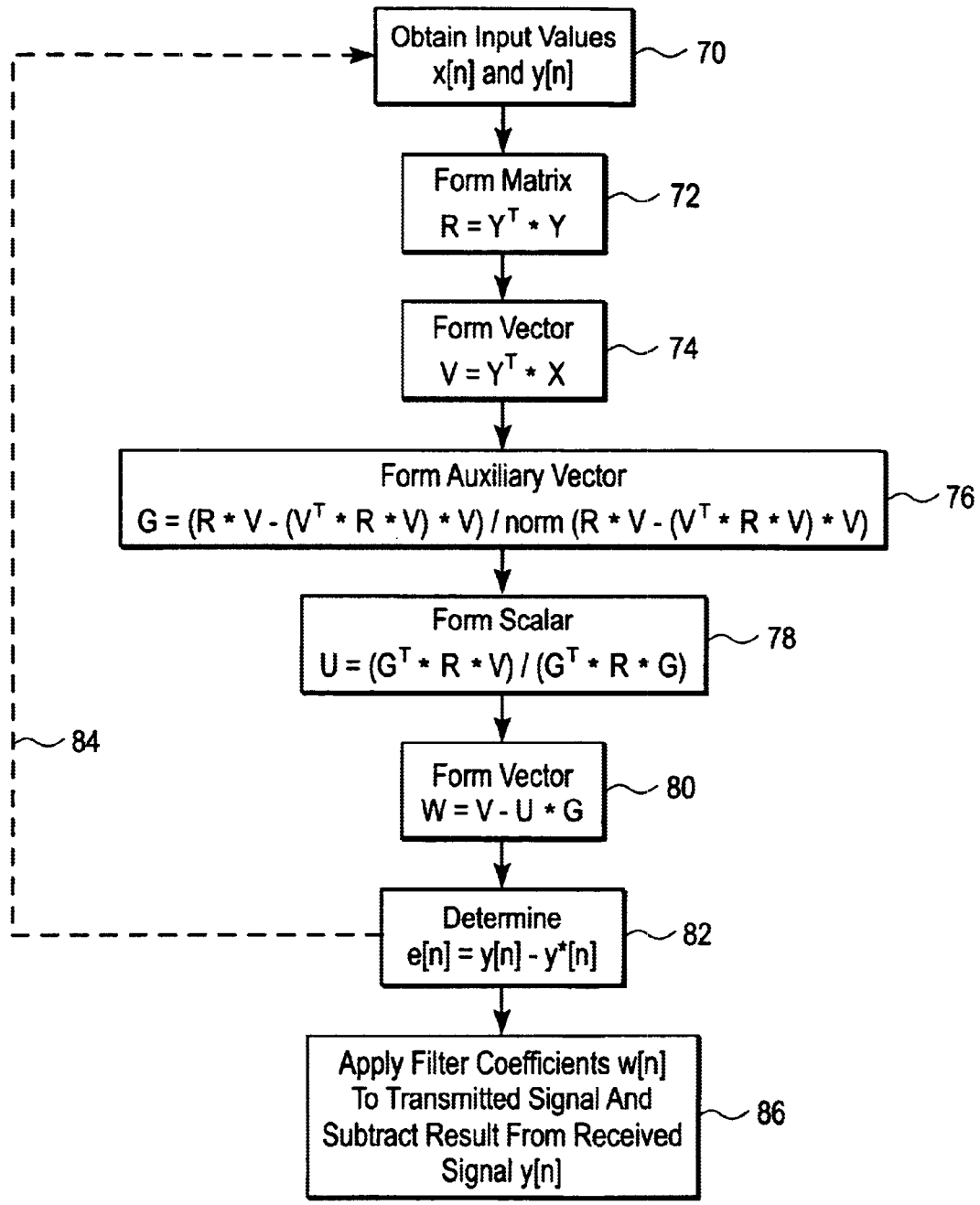
FIG. 3 is a flow diagram illustrating a method of one embodiment of the invention.

In particular, as shown in FIG. 3, in stage 70 of the process the input values are obtained and then the foregoing algorithm operations 72, 74, 76, 78 and 80 may be performed. The filter 50 stops the adaptation process after the values of the error signal e[n]=y[n]-y*[n] reach some predetermined level as indicated in stage 82. If not, the process is repeated as indicated by line 84 including taking additional samples of x[n] and y[n]. This is repeated as many times as necessary including taking multiple samples of x[n] and y[n]. Then, the filter 50 operates to remove the unwanted components (noise) from the received signal as indicated in stage 86. In the voice mail case, filter 50 may be adapted on a per-call basis, because the noise may depend on the lines used for the connection, as well as on some other random factors, which, however, are fairly stable on a per-call basis.

The algorithm may reduce the amount of time needed for training the filter 50, therefore reducing the possibility of missing user input (DTMF digit(s)) in these initial moments. It is believed that in most cases a single run through the process illustrated in FIG. 3 will be sufficient without the need for the repeat indicated by line 84. Another advantage is that the filter 50 can adapt its coefficients using a smaller number of known (training) samples of data.

While the embodiments of the invention have been describe in detail, that is for the purpose of illustration, not limitation.

What is claimed is:

1. A digital signal processing system comprising:
   a) a signal processor adapted to be connected to a pair of signal transmission paths and through which signal commands on one of the paths are transmitted; and
   b) a signal canceller operatively associated with the signal processor to subtract echo signals from received signals on the other of the paths, the signal canceller employing Auxiliary-Vector filtering at all times during operation of the signal canceller,
   wherein the signal canceller contains an array of filter coefficients and wherein the Auxiliary Vector filtering multiplies the signals by the array of filter coefficients and substracts the result from the transmitted signal command.

2. The system according to claim 1, wherein the signal canceller is adaptive in being capable of changing the filter coefficients while receiving data from the transmitted signal commands and from the received signals.

3. The system according to claim 1, wherein the filter coefficients are obtained using the algorithm:

$$R = Y^T * Y$$

$$V = Y^T * X$$

$$G = (R*V - (V^T*R*V)*V)/\text{norm}(R*V - (V^T*R*V)*V)$$

$$U = (G^T*R*V)/(G^T*R*G)$$

$$w = V - U*G$$

where the vector Y contains N values of the received signal y[n] where N is the number of filter coefficients, X contains one valtie x[n] of the transmitted signal commands, G is the Auxiliary Vector, U is a scalar which minimizes output variances of the filter coefficients and w is a vector containing the filter coefficients.

4. The system according to claim 1, wherein voice signals are processed.

5. The system according to claim 1, wherein the signal processor is the digital signal processor of a voice mail system, and wherein the signal commands include voice mail prompts.

6. A digital signal processing system comprising:
   a) a near end and a far end connected by a pair of signal transmission paths;
   b) a signal processor at the near end through which signal commands are transmitted from the near end to the far end;
   c) a signal transducing device at the far end to receive the signal commands and to transmit to the near end signals indicating the state of the signal transducing device; and
   d) a signal canceller operatively associated with the signal processor to subtract echo signals from the received signals, the signal canceller employing Auxiliary-Vector filtering at all times during operation of the signal canceller,
   wherein the signal canceller contains an array of filter coefficients and wherein the Auxiliary Vector filtering takes the signals transmitted from the far end and multiplies the transmitted signals by the array of filter coefficients and subtracts the result from the signal commands transmitted from the near end.

7. The system according to claim 6, wherein the signal canceller is adaptive in being capable of changing the filter coefficients while receiving data from the signal commands transmitted from the near end and the signals transmitted from the far end.

8. The system according to claim 6, wherein the filter coefficients are obtained using the algorithm:

$$R = Y^T * Y$$

$$V = Y^T * X$$

$$G = (R*V - (V^T*R*V)*V)/\text{norm}(R*V - (V^T R*V)*V)$$

$$U = (G^T R*V)/(G^T*R*G)$$

$$w = V - U*G$$

where the vector Y contains N values of the received signal y[n] where N is the number of filter coefficients, X contains one value x[n] of the transmitted signal commands, G is the Auxiliary Vector, U is a scalar which minimizes output variances of the filter coefficients and w is a vector containing the filter coefficients.

9. The system according to claim 6, wherein voice signals are processed.

10. The system according to claim 6, wherein the signal processor is the digital signal processor of a voice mail system, the signal transducing device is a telephone set, wherein the signal commands include voice mail prompts.

11. A digital signal processing method comprising:
   a) transmitting signal commands from a near end including a signal processor over a first signal path to a far end including a signal transducing device;
   b) receiving over a second signal path from the far end to the near end signals indicating the state of the signal transducing device; and
   c) cancelling echo signals from the signals received at the near end utilizing a signal canceller employing Auxiliary-Vector filtering at all times during operation of the signal canceller,
   wherein the cancelling includes providing an array of filter coefficients and wherein the Auxiliary Vector filtering takes the signals transmitted from the far end and multiolics the transmitted similes by the array of filter Coefficients and subtracts the result from the signal commands transmitted from the near end.

12. The method according to claim 11, wherein the cancelling is adaptive in being capable of changing the filter coefficients while receiving data from the signal commands transmitted from the near end and the signals transmitted from the far end.

13. The method according to claim 11, wherein the filter coefficients are obtained using the algorithm:

$$R = Y^T * Y$$

$$V = Y^T * X$$

$$G = (R*V - (V^T*R*V)*V)/\text{norm}(R*V - (V^T*R*V)*V)$$

$$U = (G^T*R*V)/(G^T*R*G)$$

$$w = V - U*G$$

where the vector Y contains N values of the received signal y[n] where N is the number of filter coefficients, X contains one value x[n] of the transmitted signal commands, G is the Auxiliary Vector, U is a scalar which minimizes output variances of the filter coefficients and w is a vector containing the filter coefficients.

14. The method according to claim 11, wherein voice signals are processed.

15. The method according to claim 11, wherein the signal processor is the digital signal processor of a voice mail system, the signal transducing device is a telephone set, wherein the signal commands include voice mail prompts.

16. A program storage device readable by a machine embodying a program of instructions executable by the machine for signal processing in which undesired signals are cancelled, the instructions comprising:
   a) transmitting signal commands from a near end including a signal processor over a first signal path to a far end including a signal transducing device;
   b) receiving over a second signal path from the far end to the near end signals indicating the state of the signal transducing device; and
   c) cancelling echo signals from the signals received at the near end utilizing a signal canceller employing Auxiliary-Vector filtering at all times during operation of the signal canceller,
   wherein the cancelling includes providing an array of filter coefficients and wherein the Auxiliary Vector filtering takes the signals transmitted from the far end and multiplies the transmitted signals by the array of filter coefficients and subtracts the result from the signal command transmitted from the near end.

17. The program storage device according to claim 16, wherein the cancelling is adaptive in being capable of changing the filter coefficients while receiving data from the signal commands transmitted from the near end and the signals transmitted from the far end.

18. The program storage device according to claim 16, wherein the filter coefficients are obtained using the algorithm:

$$R=Y^T*Y$$

$$V=Y^T*X$$

$$G=-(R*V(V^T*R*V)*V)/\text{norm}(R*V-(V^T*R*V)*V)$$

$$U=(G^T*R*V)/(G^TR*G)$$

$$w=V-U*G$$

where the vector Y contains N values of the received signal y[n] where N is the number of filter coefficients, X contains one value x[n] of the transmitted signal commands, G is the Auxiliary Vector, U is a scalar which minimizes output variances of the filter coefficients and w is a vector containing the filter coefficients.

19. The program storage device according to claim 16, wherein voice signals are processed.

20. The program storage device according to claim 16, wherein the signal processor is the digital signal processor of a voice mail system, the signal transducing device is a telephone set, wherein the signal commands include voice mail prompts.

* * * * *

UNITED STATES PATENT AND TRADEMARK OFFICE
CERTIFICATE OF CORRECTION

PATENT NO. : 6,944,290 B2
DATED : September 13, 2005
INVENTOR(S) : Georgiev

It is certified that error appears in the above-identified patent and that said Letters Patent is hereby corrected as shown below:

Title page,
Item [57], ABSTRACT,
Line 3, delete "processing" and insert -- processor --.

Column 5,
Line 10, delete "valtie" and insert -- value --.

Column 6,
Line 18, delete "multiolics" and insert -- multiplies --.
Line 18, delete "similes" and insert -- signals --.

Signed and Sealed this

Sixth Day of December, 2005

JON W. DUDAS
*Director of the United States Patent and Trademark Office*